United States Patent Office 3,595,936
Patented July 27, 1971

3,595,936
FILAMENT COMPRISING A POLYMER BLEND OF POLYESTER AND POLYAMIDE CONTAINING AN ORGANIC PHOSPHORUS COMPOUND AND A STERICALLY HINDERED PHENOLIC COMPOUND
Amnon Birenzvige and Gene C. Weedon, Richmond, Va., assignors to Allied Chemical Corporation, New York, N.Y.
No Drawing. Filed Apr. 29, 1969, Ser. No. 820,320
Int. Cl. C08g 41/04
U.S. Cl. 260—857     16 Claims

ABSTRACT OF THE DISCLOSURE

A process for increasing the whiteness of a filament extruded from a polymer blend comprised of polyester and polyamide which comprises incorporating in the polymer blend, prior to extrusion thereof, about 0.05 to 3 weight percent, based upon the weight of the polyamide and polyester, of an organic phosphorus compound and about 0.05 to 3 weight percent, based upon the weight of the polyamide and polyester, of a sterically hindered phenolic compound and melt extruding the polymer blend to form a filament having increased whitness.

BACKGROUND OF THE INVENTION

This invention relates to a filament having increased whiteness. More particularly, this invention relates to a process for increasing the whiteness of a filament comprising a polymer blend of polyamide and polyester using an organic phosphorus compound and a sterically hindered phenolic compound.

Carpets and fabrics made from fibers comprising a polyamide matrix having polyester microfibers dispersed therein have generated considerable interest in the textile industry and their luxurious properties have made them desirable over carpets and fabrics made from other fibers. Unfortunately, these fibers have a possible disadvantage in that they are somewhat yellow in color as currently produced by conventional processes.

The apparel industry, for example, prefers a white fiber and pays a premium price for such a fiber; therefore, it is highly desirable for marketing and other reasons that these fibers be white.

It has now been discovered that the whiteness of a filament comprising a polymer blend of polyamide and polyester can be increased by incorporating in the polymer blend, prior to extrusion thereof, a small amount of an organic phosphorus compound and a sterically hindered phenolic compound. The organic phosphorus compound and the sterically hindered phenolic compound act in synergism to increase the whiteness of the filament to an extent which is not possible with either compound when used alone or in larger concentrations.

Furthermore, it has been found that these fibers comprising a polyamide matrix having polyester microfibers dispersed therein can be made into fabric which can be fused by heat in such a manner to produce a dimensionally stable fabric which retains its original fabric-like appearance after it is fused. There is the disadvantage, however, of the fabric turning from white to brown during the fusing process.

It has now been discovered that a fused, dimensionally stable fabric which is white can be produced by incorporating in the polymer blend, prior to extrusion thereof into filaments, a small amount of an organic phosphorus compound and a sterically hindered phenolic compound. The organic phosphorus compound and the sterically hindered phenolic compound act in synergism to retain the whiteness of the fused fabric to an extent which is not possible with either compound when used alone or in larger concentrations.

SUMMARY OF THE INVENTION

In accordance with the present invention, the whiteness of a filament extruded from a polymer blend comprised of polyester and polyamide is increased by a process which comprises incorporating in the polymer blend, prior to extrusion thereof, about 0.05 to 3 weight percent, based upon the weight of the polyamide and polyester, of an organic phosphorus compound which can be one having the general formulas:

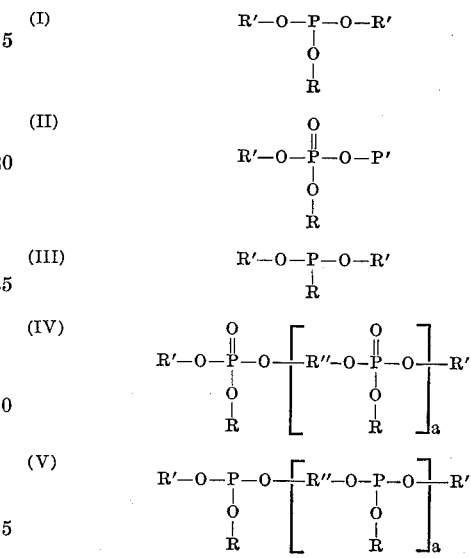

or mixtures thereof; wherein R is aryl containing up to about 12 carbon atoms, alkyl containing up to about 25, preferably up to about 12 carbon atoms, or aralkyl containing up to about 30, preferably up to about 18 carbon atoms; R' is hydrogen, aryl containing up to about 12 carbon atoms, alkyl containing up to about 25, preferably up to about 12 carbon atoms, aralkyl containing up to about 30, preferably up to about 18 carbon atoms, or an alkali metal; R" is a divalent aliphatic or aromatic radical containing up to about 12 carbon atoms; and $a$ is an integer from 1 to about 25, and about 0.05 to 3 weight percent, based upon the weight of the polyamide and polyester, of a sterically hindered phenolic compound which can be one having the general formulas:

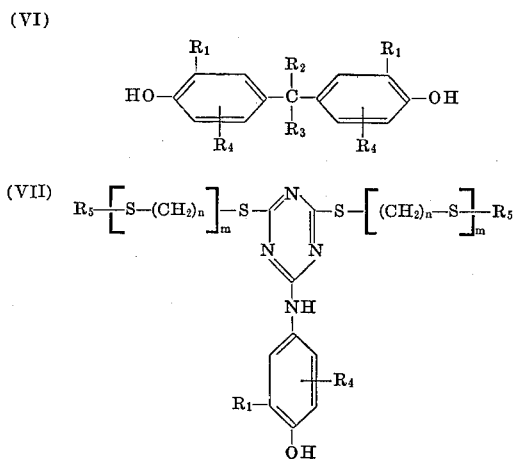

VIII) 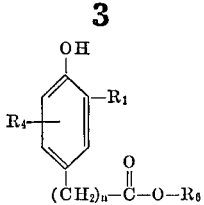

(IX) 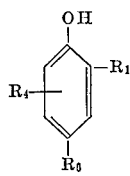

(X) 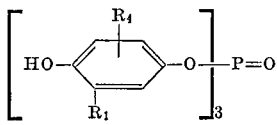

(XI) 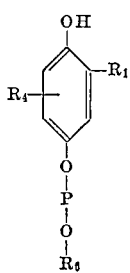

(XII) 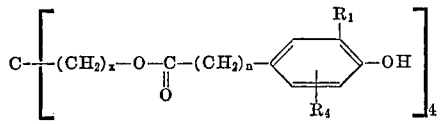

or mixtures thereof; wherein $R_1$ is a sterically hindered radical selected from the group consisting of cyclohexyl, phenyl and alkyl containing about 3 to 8 carbon atoms, which is preferably tertiary alkyl and most preferably is tertiary butyl; $R_2$ is hydrogen or a lower alkyl radical containing up to about 8 carbon atoms but preferably up to about 4 carbon atoms; $R_3$ is a lower alkyl radical containing up to about 8 carbon atoms but preferably up to about 4 carbon atoms; $R_4$ is hydrogen or a lower alkyl radical containing up to about 8 carbon atoms but preferably $R_4$ is a tertiary alkyl radical containing 4 to about 8 carbon atoms and is preferably in the ortho position to the OH radical; $R_5$ is hydrogen or an alkyl radical containing 1 to about 30, preferably about 5 to 15, carbon atoms; $R_6$ is an alkyl radical containing about 5 to 30, preferably about 15 to 20, carbon atoms; $n$ is an integer of 2 to 6; $m$ is an integer of 0 to 3; and $x$ is an integer of 1 to 3 but preferably 1 or 2; and melt extruding the polymer blend to form a filament having increased whiteness. In a preferred embodiment of the present invention the filament comprises a polyamide matrix having polyester microfibers dispersed therein.

DESCRIPTION OF THE INVENTION

The filaments produced in accordance with the present invention can be prepared from blends of polyester and polyamide such as disclosed in U.S. Pat. 3,369,057 to Twilley. As disclosed in Twilley, supra, the proportion of end groups of the polyamide, especially amine groups, which are reactive in the melt with the polyester should be restricted to not over 40 percent of the polyamide end groups. In addition, other blends of polyester and polyamide are satisfactory for purposes of this invention, including those disclosed in U.S. Pats. 3,378,055, 3,378,056, 3,378,602, and 3,382,305; British Pat. 1,097,068; Belgian Pat. 702,813; and Netherlands Pats. 6606838 and 6612628.

In the filaments produced in accordance with the preferred embodiment of the present invention, the polyester ingredient is dispersed as discrete microfibers throughout the polyamide which forms a continuous phase or matrix. The polyester microfibers have average diameter not above 1 micron and preferably not above 0.5 micron. In length the microfibers vary widely, but substantially all are elongated. The microfibers may be continuous or discontinuous within the matrix. On the average they are at least 5 times and usually at least 20 times longer than the average diameter, typically averaging in length about 250 times their average diameter. In the filaments, the microfibers lie predominantly in the direction of the filament axis. The dispersion of microfibers in the filament is substantially uniform, both lengthwise and across each filament. Typically at least 100 microfibers traverse each cross-section of each filament. The microfibers will generally have essentially round cross-section, although their diameter may vary along their length and they may taper toward their ends as a result of the shears imposed during drawing.

The filaments produced in accordance with the preferred embodiment of the present invention comprise, per 100 parts by weight total polyamide and polyester, about 50 to 90 parts of the polyamide as the matrix and dispersed therein about 50 to 10 parts of the polyester.

There is a large interface between the two phases of polyester and polyamide because of the very small size of the polyester microfibers dispersed in the polyamide matrix and this large interface can become important in certain instances. Among others, an interchange reaction can take place which will enhance degradation of the polymers at the interface. For some still unclear reasons, this interface may enhance the creation of free radicals. This has been shown by exposing the polyester-polyamide blend filaments to small dosages of X-ray radiation. Upon exposure of the filaments to X-rays, a pink glow appears in the filaments which fades with time. When the polyester-polyamide blend filaments are immersed in hydroquinone after exposure to X-rays, the pink glow disappears almost immediately. No such pink glow appears when polyester or polyamide filaments alone are exposed to small dosages of X-ray radiation. The presence of this pink glow is believed to be caused by the creation of free radicals. It is believed that free radicals can also be created at high temperatures during extrusion of the polyester-polyamide blend filaments or during fusion of the fabric produced therefrom. The presence of an organic phosphorus compound and a hindered phenolic compound of the present invention is believed to prevent further degradation caused by free radical reactions and thereby increases the whiteness of the filaments.

Suitable polyamides for use in the present invention include, for example, those prepared by condensation of hexamethylene diamine and adipic acid, condensation of hexamyethylene diamine and sebacic acid known as nylon 6,6 and nylon 6,10, respectively, condensation of bis(para-aminocyclohexyl) methane and azelaic acid, condensation of bis(para-aminocyclohexyl)methane and dodecanedioic acid, or by polymerization of 6-caprolactam, 7-aminoheptanoic acid, 8-caprylactam, 9-aminopelargonic acid, 11-aminoundecanoic acid, and 12-dodecalactam, known as nylon 6, nylon 7, nylon 8, nylon 9, nylon 11 and nylon 12, respectively.

The polyesters useful in the practice of this invention can be prepared in general by condensation reactions between dicarboxylic acids or their derivatives and compounds containing two hydroxyl groups, or materials possessing both an alcohol group and a carboxylic acid group or derivative thereof; or by the condensation-polymerization of lactones. Dicarboxylic acid derivatives which can be employed include esters, salts, anhydrides and acid halides. The monomeric species employed in the preparation of the polyesters are preferably not more highly functional than difunctional in their reactivity so as to produce essentially linear, non-crosslinked polymer structures.

Suitable polyesters for use in the present invention include those polymers in which one of the recurring units in the polyester chain is the diacylaromatic radical from terephthalic acid, isophthalic acid, 5-t-butylisophthalic acid, a naphthalene dicarboxylic acid such as naphthalene 2,6 and 2,7 dicarboxylic acids, a diphenyldicarboxylic acid, a diphenyl ether dicarboxylic acid, a diphenyl alkylene dicarboxylic acid, a diphenyl sulphone dicarboxylic acid, an azo dibenzoic acid, a pyridine dicarboxylic acid, a quinoline dicarboxylic acid, and analogous aromatic species including the sulfonic acid analogues; diacyl radicals containing cyclopentane or cyclohexane rings between the acyl groups; and such radicals substituted in the ring, for example, by alkyl or halo substituents.

The dioxy radical representing the other principal recurring unit in the polyester chain can be an open chain aliphatic such as ethylene glycol or ether thereof, for example, the diether, or can contain rings such as those which form part of the above noted diacyl radicals. The carboxy and/or the oxy chain members can be directly attached to a ring or removed by one or more carbons therefrom, as in the 1,4 dioxymethyl cyclohexane radical. Suitable polyesters for use in the present invention include, for example, polyethylene isophthalate and polyethylene 2,6 naphthalene dicarboxylate. The preferred polyester for use in this invention is polyethylene terephthalate.

The organic phosphorus compound can be an organic phosphite, phosphinate, phosphate, polymeric phosphite, polymeric phosphate, the corresponding acid, or mixtures thereof having the general formulas as previously described.

Generally speaking, about 0.05 to 3 weight percent of the organic phosphorus compound based upon the weight of the polyamide and polyester can be employed in the practice of this invention, however, it is preferred that about 0.1 to 1 weight percent be used. The organic phosphorus compound contains at least one aryl, alkyl, or aralkyl group and the preferred group is aryl such as phenyl. Other suitable aryls include, for example, phenyl, 1-naphthyl, 2-naphthyl, biphenyl, anthracyl, phenanthyl, and the like. Suitable alkyls include, for example, methyl, ethyl, n-propyl, iso propyl, tert butyl, decyl, hexadecyl, cyclohexyl, and the like. Suitable aralkyls include, for example, nonylphenyl, benzyl, tolyl, and the like. Suitable divalent aliphatic or aromatic radicals include, for example, ethylene, propylene, butylene, phenylene, and the like. When the organic phosphorus compound used is an alkali metal phosphite, phosphinate, phosphate, polymeric phosphite, or polymeric phosphate, the alkali metal is preferably sodium and more preferably disodium such as disodium phenyl phosphinate, however, other suitable alkali metals include those of lithium and potassium. Suitable organic phosphites, phosphinates, phosphates, polymeric phosphites, polymeric phosphates, and their corresponding acids useful in this invention include, for example, triphenyl phosphite, didecyl phenyl phosphite, diethyl phenyl phosphite, phosphinic acid, disodium phenylphosphinate, disodium phenyl phosphate, sodium diphenyl phosphate, sodium diethyl phosphate, tris(4 nonyl phenyl)phosphite, trihexadecylphosphate, triphenylphosphate, tribenzylphosphate, trilaurel phosphite, triethyl phosphite, poly(ethylene butyl phosphite), poly(ethylene phenyl phosphate), and the like.

The sterically hindered phenolic compounds used in this invention are well-known compounds. The phenolic group is sterically hindered by the presence of at least one alkyl substituent on the ring ortho to the phenolic group. Alkyl groups of from about 3 to 8 carbon atoms are effective. Tertiary alkyl groups are preferred.

Representative sterically hindered phenolic compounds suitable for use in this invention are:

1,1 bis(2-methyl-4-hydroxy-5-tert-butylphenyl)butane;
2,2 bis(2-methyl-4-hydroxy-5-tert-butylphenyl)pentane;
1,1 bis(2-methyl-4-hydroxy-5-tert-butylphenyl)propane;
2,2 bis(2-methyl-4-hydroxy-5-tert-butylphenyl)butane;
1,1 bis(3-methyl-4-hydroxy-5-tert-butylphenyl)butane;
1,1 bis(3,5-di-tert-butyl-4-hydroxyphenyl)butane;
1,1 bis[2-methyl-4-hydroxy-5-(1,1 dimethylpropyl)phenyl]butane;
2(4-hydroxy-3,5-di-tert-butylanilino)-4,6-bis(n-octylthio) 1,3,5-triazine;
2(4-hydroxy-3,5-di-tert-butylanilino)-4,6-bis(n-nonylthio) 1,3,5-triazine;
2(4-hydroxy-3,5-di-tert-butylanilino)-4,6-bis(n-heptylthio)1,3,5 triazine;
2(4-hydroxy-3-tert-butyl-5-isopropylanilino)-4,6-bis (n-octylthio)1,3,5 triazine;
2[4-hydroxy-3-tert-butyl-5-(1,1-dimethylpropyl)anilino]-4,6-bis(n-octylthio)1,3,5 triazine;
octadecyl 3(3,5-di-tert-butyl-4-hydroxyphenyl) propionate;
eiconyl 3-(3,5-di-tert-butyl-4-hydroxyphenyl)propionate;
pentadecyl 3-(3,5-di-tert-butyl-4-hydroxyphenyl) propionate;
octadecyl 3-[3(1,1 dimethylpropyl)-5-tert-butyl-4-hydroxyphenyl]propionate;
octadecyl 4-(3,5-di-tert-butyl-4-hydroxyphenyl) butyrate;
2,6 di-tert-butyl-4-octadecylphenol;
2-tert-butyl-4-octadecyl-6-(1,1 dimethylpropyl)phenol;
2,6 di-tert-butyl-4-eiconylphenol;
2,6 di-tert-butyl-4-heptadecylphenol;
tris(3,5-di-tert-butyl-4-hydroxyphenyl)phosphate; and
octadecyl(3,5-di-tert-butyl-4-hydroxyphenyl)phosphite.

Generally speaking, about 0.05 to 3 weight percent of the sterically hindered phenolic compound, based upon the weight of the polyamide and polyester is useful in the practice of this invention; however, it is preferred that about 0.1 to 1 weight percent be used.

The organic phosphorus compound and the sterically hindered phenolic compound can be incorporated into either the polyamide or polyester or both during the respective polymerization or can be dry blended with the polyamide and polyester granules prior to the melting of the blend of polymers by conventional addition and dry mixing procedures. The organic phosphorus compound and the sterically hindered phenolic compound can also be incorporated into the molten blend of polymer by, for example, injection into the mixing portion of the extruder prior the melt extrusion of the filament.

The filament produced in accordance with the present invention can be processed into conventional knitted, woven, or non-woven fabric. If desired, the filamets comprising these fabrics can be fused together in accordance with the method described in U.S. application Ser. No. 727,327, filed May 7, 1968, to produce dimensionally stable fabrics which retain their original fabric-like appearance.

Several systems are suitable for heat treating the fabric as, for example, a forced air oven with a nitrogen purge, a static draft oven without nitrogen, heated match-die molds, a molding press or a steam autoclave. The method of heating has been found to be of little consequence.

For any given fabric, the temperature and time will vary depending on the ratio of polymeric materials, article size, shape, desired rigidity, mode of heat application and other variables. In general, it is necessary to apply heat without excessive degradation of sufficient intensity and duration at least as high as the melting point of the nylon matrix until the fabric yarns have fused to each other yet still retain the yarn or fabric identity. If the fabric yarns are spun from staple fibers, the fibers forming the yarn will fuse together individually in addition to fusion at the cross points of the fabric. Fusion can be achieved without undesirable flow; it is this phenomenon which permits the process to provide unique dimensional stability and appearance to textile materials and, therefore, regulates the minimum and maximum heat-set conditions. Thus, the fabric interstices are practically unaltered by the fusion as described herein since there is no polymer flow or migration, provided the dimensions of the fabric are maintained.

Thus, while no empirical or mathematical formula has been found for determining the minimum heat-setting conditions to fuse the filaments of the present invention, appearance after heating, and in particular, after fusion and removal of the nylon by formic acid has been found to be an important criterion.

The discovery has been made that an unusual fusion characteristic exists in the structure formed by the dispersed fibrils which unexpectedly are bonded together even though the melt temperature thereof has not been reached during the heat-set operation. The appearance of this fused microfibrillar dispersion can be evaluated as a reliable index of the degree of fusion.

The optimum fusion temperature for a nylon-polyester combination containing 30 parts by weight of polyethylene terephthalate microfibers dispersed in 70 parts by weight of polycaproamide (nylon 6), is about 240° C. for efficient fusion, fiber integrity retention, coloration, and controllable hand and texture suitable for treatment. Naturally the time for fusion is dependent on many factors, including the amount of polyester dispersed in the polyamide matrix, the filament or yarn size, fabric construction, that is, knit, weave, loose, tight, etc. and, of course, the ultimate texture desired in the fabric. Thus, time periods are determined by the mass to be heated and the type of heat source employed. For example, when employing an oven, durations as short as about 15–20 seconds at about 230° C. have been found effective for at least partial fusion when a softer fabric is desired. Fusion times of up to about 10 minutes and longer at about 255° C. can be employed, however, the breaking strength of the fabric is reduced somewhat.

To summarize, for 70 denier yarn, 10 to 300 seconds in a dry oven at 240° C. appears to be the optimum fusion condition where substantially complete fusion is obtained, as determined by removing the nylon with formic acid to determine if the remaining polyester has maintained a true fabric appearance, being cohesive and elastic.

PREFERRED EMBODIMENTS

The following examples illustrate the practice and principles of this invention and a mode of carrying out the invention.

Example 1

Synthetic multifilament yarns were produced in accordance with the procedure used in Example 1 of U.S. Pat. 3,369,057 to Twilley. Granular polyethylene terephthalate polymer was used, melting about 255° C. (DTA) and about 265° C. (optical), having a density (when amorphous) of about 1.33 grams per cc. at 23° C. and about 1.38 grams per cc. in the form of drawn filament, having a reduced viscosity of about 0.85 in ortho-chlorophenol and having a $T_G$ of about 65° C. The polyester in the form of drawn filament drawn to give ultimate elongation not above 20 percent will have a tensile modulus (modulus of elasticity) ranging from about 70 to about 140 grams per denier, depending on the extrusion conditions employed.

Mixtures were prepared comprising 30 parts of granular polyester mixed with 70 parts of granular nylon 6 (polycaproamide) having a reduced viscosity of about 1.04 in 90 percent formic acid, a $T_G$ of about 35° C., and a density of about 1.14 grams per cc. at 23° C. The amine groups in the nylon 6 (polycaproamide) were blocked by reaction with sebacic acid, bringing the amine group analyses thereof to 11 milliequivalents of $NH_2$ groups per kilogram of polymer. The nylon 6 (polycaproamide) contained, as a heat stabilizer, 50 p.p.m. copper as cupric acetate. Two sterically hindered phenolic compounds and an organic phosphorus compound listed in Table I below were separately dry blended with the above mixtures of polyamide and polyester granules in an amount of 0.5 weight percent additive, based on the weight of the polyester and polyamide.

The mixtures of polyamide and polyester granules and the additives were each blended in a double cone blender for one hour. The granular blends were dried to a moisture content of no more than 0.01 percent; then melted at 285° C. in a 3½ inch diameter screw extruder operated at a rotational speed of about 39 r.p.m. to produce a pressure of 3000 p.s.i.g. at the outlet. A dry nitrogen atmosphere was used to protect the blends against absorbing moisture. Residence time in the extruder was 8 minutes.

The molten mixtures thereby obtained had melt viscosities of about 2000 poises at 285° C. The polyester was uniformly dispersed throughout each mixture and had an average particle diameter of about 2 microns, as observed by cooling and solidifying a sample of the melt, leaching out the polyamide component with formic acid, and examining the residual polyester material.

The molten mixtures thereby obtained were extruded through a spinnerette plate having 14 orifices of circular cross-section, and the resulting fibers were drawn and wound, the final yarn deniers generally being about 70. The polyethylene terephthalate microfibers had an average diameter not above 1 micron and had an average length at least 20 times their average diameter. The microfibers lay predominantly in the direction of the filament axis. The properties of the multifilament yarns produced in this example are contained in Table I below.

TABLE I

| Whitening additive | Weight percent additive | Visual appearance | Yellow [1] Index |
|---|---|---|---|
| (A) None (control) | None | Very yellow | 123 |
| (B) Triphenyl phosphite | 0.5 | White | 115 |
| (C) 2,6-di-tert-butyl-4-octadecylphenol. | 0.5 | do | 112 |
| (D) 1,1-bis-(5-tert-butyl-4-hydroxy-2-methylphenyl) butane. | 0.5 | do | 112 |

[1] Measured on a Reflectance Colorimeter. The reflectance was measured at 420, 530 and 576 millimicrons. The Yellow Index was then calculated in a conventional manner common to the art. A Yellow Index of 100 is considered to be pure white.

Example 2

Synthetic multifilament yarns were produced in the same manner as in Example 1 of the present invention except that 0.1 weight percent triphenyl phosphite (Organic Phosphorus Compound B, Example 1) and 0.1 weight percent 2,6-di-tert-butyl - 4 - octadecylphenol (Sterically Hindered Phenolic Compound C, Example 1) where dry blended with a mixture of polyamide and polyester granules and 0.25 weight percent triphenyl phosphite (Organic Phosphorus Compound B, Example 1) and 0.25 weight percent 1,1-bis-(5-tert-butyl-4-hydroxy-2-methylphenyl)butane (Sterically Hindered Phenolic Compound D, Example 1) were dry blended with a mixture of polyamide and polyester granules and yarns were produced. The properties of the multifilament yarns produced in this example are contained in Table II below.

A comparison of Examples 1 and 2 shows that there is a very significant synergistic effect on increasing the whiteness when an organic phosphorus compound is used with a sterically hindered phenolic compound. When the organic phosphorus compound or the sterically hindered phenolic compound was used at a concentration of 0.5 weight percent, the Yellow Index of the yarn ranged from about 112 to 115. When both the organic phosphorus compound and the sterically hindered phenolic compound were used togeher at a concentration of 0.1 weight percent each or a combined concentration of only 0.2 weight percent, the Yellow Index was reduced to 103 thereby producing a very significant synergistic effect in increasing the whiteness of the yarn.

TABLE II

| Synergistic mixture | Weight percent each additive | Visual appearance | Yellow [1] Index |
|---|---|---|---|
| (A) None (control) | None | Very yellow | 123 |
| (E) Triphenyl Phosphite and 2,6-di-tert-butyl-4-octadecylphenol. | 0.1 / 0.1 | White | 103 |
| (F) Triphenyl Phosphite and 1,1-bis-(5-tert-butyl-4-hydroxy-2-methylphenyl)-butane. | 0.25 / 0.25 | White | 102 |

[1] See Table I footnote.

Example 3

The multifilament yarns produced in Examples 1 and 2 and a control yarn, containing no additive, were knitted into sleeves. The yarns each contained 14 filaments and were drawn at a draw ratio of about 3× to a final denier of about 70. The fabrics were bonded by fusing them on a tenter frame at 30 percent overfeed for 3 minutes at 250° C. in accordance with the method described in U.S. application Ser. No. 727,327, filed May 7, 1968. The properties of the fabrics produced in this example are contained in Table III below.

The data in Table III shows that there is a very significant synergistic effect on increasing the whiteness of a fused fabric when an organic phosphorus compound is used with a sterically hindered phenolic compound. Heretofore it has not been possible to produce a white fused fabric because the temperatures of the fabric fusing process always produced a yellow or brown fabric even when whitening additives were present in the polymer blend. As shown in Table III, when the organic phosphorus compound or the sterically hindered phenolic compound was used at a concentration of 0.5 weight percent the Yellow Index of the fabric ranged from about 127 to 133. When both the organic phosphorus compound and the sterically hindered phenolic compound were used together at a concentration of 0.1 weight percent each or a combined concentration of only 0.2 weight percent, the Yellow Index was reduced to 117 thereby producing a very significant synergistic effect which resulted in a white fused fabric—an accomplishment which heretofore has never been done.

The fused fabrics were dimensionally stable and retained their original fabric-like appearance.

TABLE III

| Whitening additive | Weight percent each additive | Visual appearance | Yellow [1] Index |
|---|---|---|---|
| (G) None (control) | None | Brown | 138 |
| (H) Triphenyl Phosphite | 0.5 | Very yellow | 127 |
| (I) 2,6 di-tert-butyl-4-octadecylphenol. | 0.5 | do | 133 |
| (J) Triphenyl Phosphite and 2,6-di-tert-butyl-4-octadecylphenyl | 0.1 / 0.1 | White | 117 |

[1] See Table I footnote.

What is claimed is:

1. A process for increasing the whiteness of a filament extruded from a polymer blend comprised of a fiber-forming polyester and a fiber-forming polyamide, said polymer blend comprising per 100 parts by weight total polyamide and polyester, about 50 to 90 parts of polyamide having dispersed therein about 50 to 10 parts of polyester, said polyamide having not over 40 percent of the end groups reactive with said polyester, which comprises incorporating in the polymer blend, prior to extrusion thereof, about 0.05 to 3 weight percent, based upon the weight of the polyamide and polyester, of an organic phosphorus compound having the general formula:

(I)         R′—O—P—O—R′
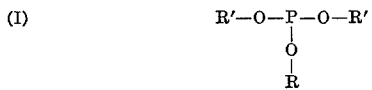

wherein R is selected from the group consisting of aryl containing up to about 12 carbon atoms, alkyl containing up to about 25 carbon atoms and aralkyl containing up to about 30 carbon atoms; R′ is selected from the group consisting of hydrogen, aryl containing up to about 12 carbon atoms, alkyl containing up to about 25 carbon atoms, aralkyl containing up to about 30 carbon atoms and an alkali metal; and about 0.05 to 3 weight percent, based upon the weight of the polyamide and polyester, of a sterically hindered phenolic compound selected from the group having the general formulas:

(II)
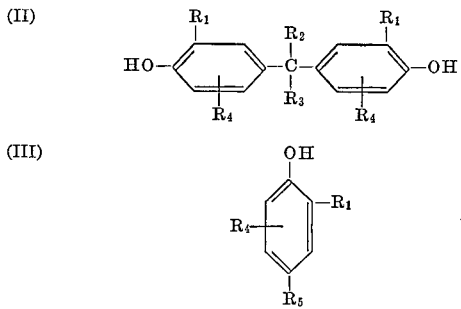

(III)

and mixtures thereof; wherein $R_1$ is a sterically hindered radical selected from the group consisting of cyclohexyl, phenyl, and alkyl containing about 3 to 8 carbon atoms; $R_2$ is selected from the group consisting of hydrogen and a lower alkyl radical containing up to about 8 carbon atoms; $R_3$ is a lower alkyl radical containing up to about 8 carbon atoms; $R_4$ is selected from the group consisting of hydrogen and a lower alkyl radical containing up to about 8 carbon atoms; $R_5$ is an alkyl radical containing about 5 to 30 carbon atoms; and melt extruding the polymer blend to form a filament having increased whiteness.

2. The process of claim 1 wherein the filament comprises a polyamide matrix having polyester microfibers dispersed therein.

3. The process of claim 2 wherein $R_1$ is a tertiary alkyl radical containing 4 to about 8 carbon atoms, and $R_5$ is an alkyl radical containing about 15 to 20 carbon atoms.

4. The process of claim 3 wherein the organic phosphorus compound is selected from the group consisting of triphenyl phosphite, tris(4 - nonylphenyl) phosphite, disodium phenyl phosphinate, triphenyl phosphate, poly(ethylene butyl phosphite), and poly(ethylene phenyl phosphate) and the sterically hindered phenolic compound is selected from the group consisting of 2,6-di-tert-butyl-4-octadecylphenol; 1,1 - bis(5 - tert-butyl - 4-hydroxy - 2 - methylphenyl)butane; 2(4 - hydroxy - 3,5-di-tert-butylanilino) - 4,6 bis(n-octylthio) 1,3,5 triazine; tetrakis[3,5(di-tert-butyl-4 - hydroxy-hydrocinnamoyloxymethylene]methane; octadecyl 3-(3,5-di-tert-butyl-4-hydroxyphenyl)propionate; tris(3,5-di-tert-butyl-4-hydroxyphenyl)phosphate; and octadecyl - (3,5 - di-tert-butyl-4-hydroxyphenyl)phosphite.

5. The process of claim 3 wherein the amount of organic phosphorus compound incorporated into the polymer blend is about 0.1 to 1 weight percent and the amount of sterically hindered phenolic compound incorporated into the polymer blend is about 0.1 to 1 weight percent based upon the weight of the polyamide and polyester.

6. The process of claim 2 wherein the polyamide is polycaproamide and the polyester is polyethylene terephthalate.

7. The process of claim 2 wherein the organic phosphorus compound and the sterically hindered phenolic compound are dry blended with polyamide and polyester granules.

8. The process of claim 2 wherein the organic phosphorus compound and the sterically hindered phenolic compound are incorporated into a molten polymer blend comprised of polyester and polyamide.

9. The process of claim 2 wherein the organic phosphorus compound and the sterically hindered phenolic compound are incorporated into one of said polymers during polymerization of said polymer.

10. A filament having increased whiteness comprising a polymer blend of a fiber-forming polyester and a fiber-forming polyamide, said polymer blend comprising, per 100 parts by weight total polyamide and polyester, about 50 to 90 parts of polyamide having dispersed therein about 50 to 10 parts of polyester, said polyamide having not over 40 percent of the end groups reactive with said polyester, containing about 0.05 to 3 weight percent, based upon the weight of the polyamide and polyester, of an organic phosphorus compound having the general formula:

(I) 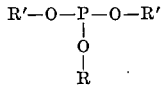

wherein R is selected from the group consisting of aryl containing up to about 12 carbon atoms, alkyl containing up to about 25 carbon atoms and aralkyl containing up to about 30 carbon atoms; R' is selected from the group consisting of hydrogen, aryl containing up to about 12 carbon atoms, alkyl containing up to about 25 carbon atoms, aralkyl containing up to about 30 carbon atoms and an alkali metal; and about 0.05 to 3 weight percent, based upon the weight of the polyamide and polyester, of a sterically hindered phenolic compound selected from the group having the general formulas:

(II) 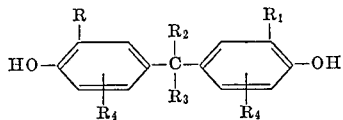

(III) 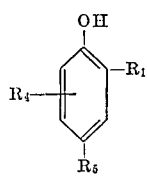

and mixtures thereof; wherein $R_1$ is a sterically hindered radical selected from the group consisting of cyclohexyl, phenyl, and alkyl containing about 3 to 8 carbon atoms; $R_2$ is selected from the group consisting of hydrogen and a lower alkyl radical containing up to about 8 carbon atoms; $R_3$ is a lower alkyl radical containing up to about 8 carbon atoms; $R_4$ is selected from the group consisting of hydrogen and a lower alkyl radical containing up to about 8 carbon atoms; and $R_5$ is an alkyl radical containing about 5 to 30 carbon atoms.

11. The filament of claim 10 wherein the filament comprises a polyamide matrix having polyester microfibers dispersed therein.

12. The filament of claim 11 wherein $R_1$ is a tertiary alkyl radical containing 4 to about 8 carbon atoms, and $R_5$ is an alkyl radical containing about 15 to 20 carbon atoms.

13. The filament of claim 12 wherein the organic phosphorus compound is selected from the group consisting of triphenyl phosphite, tris(4 nonylphenyl) phosphite, disodium phenyl phosphinate, triphenyl phosphate, poly(ethylene butyl phosphite), and poly (ethylene phenyl phosphate) and the sterically hindered phenolic compound is selected from the group consisting of 2,6-di-tert-butyl-4-octadecylphenol; 1,1-bis(5 - tert-butyl - 4 - hydroxy - 2 - methylphenyl)butane; 2(4-hydroxy-3,5-di-tert-butylanilino) - 4,6-bis(n-octylthio) 1,3,5 - triazine; tetrakis[3,5(di-tert-butyl - 4 - hydroxy-hydrocinnamoyl-oxymethylene] methane; octadecyl 3-(3,5-di-tert-butyl-4-hydrovyphenyl)propionate; tris(3.5-di-tert-butyl - 4 - hydroxyphenyl)phosphate; and octadecyl (3,5-di-tert-butyl-4-hydroxyphenyl)phosphite.

14. The filament of claim 11 wherein the amount of organic phosphorus compound contained in the filament is about 0.1 to 1 weight percent and the amount of sterically hindered phenolic compound contained in the filament is about 0.1 to 1 weight percent based upon the weight of the polyamide and polyester.

15. The filament of claim 11 wherein the polyamide is polycaproamide and the polyester is polyethylene terephthalate.

16. A fabric constructed from the filaments of claim 11 wherein said filaments comprising the fabric are fused together to produce a dimensionally stable fabric whereby the original fabric-like appearance is retained and the fabric has increased whiteness.

References Cited

UNITED STATES PATENTS

| | | | |
|---|---|---|---|
| 2,493,597 | 1/1950 | Rothrock | 260—45.7 |
| 3,285,855 | 11/1966 | Dexter | 260—45.85 |
| 3,330,859 | 7/1967 | Dexter | 260—45.85 |
| 3,369,057 | 2/1968 | Twilley | 260—857 |

FOREIGN PATENTS

| | | | |
|---|---|---|---|
| 1,485,341 | 5/1967 | France | 260—857 |

PAUL LIEBERMAN, Primary Examiner

U.S. Cl. X.R.

260—45.7P, 45.8N, 45.85R, 45.95R, 75R, 78R, 78.3R